United States Patent [19]
Tamai

[11] Patent Number: 5,949,556
[45] Date of Patent: Sep. 7, 1999

[54] IMAGE PROCESSING SUITABLE FOR CHANGING THE NUMBER OF COLORS IN AN IMAGE

[75] Inventor: Shunichi Tamai, Tokyo, Japan

[73] Assignee: Canon Kabushiki Kaisha, Tokyo, Japan

[21] Appl. No.: 08/321,018

[22] Filed: Oct. 6, 1994

Related U.S. Application Data

[63] Continuation of application No. 08/073,614, Jun. 8, 1993, abandoned, which is a continuation of application No. 07/577,008, Sep. 4, 1990, abandoned.

[30] Foreign Application Priority Data

| Sep. 4, 1989 | [JP] | Japan | 1-227452 |
| Sep. 4, 1989 | [JP] | Japan | 1-227453 |

[51] Int. Cl.[6] ............................................. G03F 3/08
[52] U.S. Cl. ...................... 358/518; 358/501; 358/520; 358/530
[58] Field of Search ..................................... 358/501, 504, 358/518, 520, 521, 529, 530, 458

[56] References Cited

U.S. PATENT DOCUMENTS

| 3,739,078 | 6/1973 | Pugsley et al. | 358/80 |
| 4,649,423 | 3/1987 | Hoffrichter et al. | 358/80 |
| 4,731,662 | 3/1988 | Udagawa et al. | 358/80 |
| 4,733,295 | 3/1988 | Hemsky et al. | 358/80 |
| 4,819,077 | 4/1989 | Kikuchi et al. | 358/80 |
| 4,876,589 | 10/1989 | Orsburn et al. | 358/80 |
| 4,982,277 | 1/1991 | Katoh et al. | 358/529 |
| 5,060,060 | 10/1991 | Udagawa et al. | 358/80 |
| 5,191,444 | 3/1993 | Harada et al. | 358/458 |

FOREIGN PATENT DOCUMENTS

| 61-212186 | 9/1986 | Japan | H04N 9/79 |
| 61-223893 | 10/1986 | Japan | G09G 1/28 |
| 61-223894 | 10/1986 | Japan | G09C 1/28 |
| 64-12381 | 1/1989 | Japan | G06F 15/68 |

*Primary Examiner*—Thomas D. Lee
*Attorney, Agent, or Firm*—Fitzpatrick, Cella, Harper & Scinto

[57] ABSTRACT

An image processing apparatus converts color image data into hue, saturation and luminosity data. When a specific color portion and a range are designated in the hue data, processing for reducing tones is executed based on the designated data. Thereafter, a reverse-conversion into color image data is performed, thereby making it possible to output a high-quality image of an illustration. Further, a histogram of designated hue data is generated, processing for reducing tones is executed based on the histogram, and the data is subsequently reverse-converted into color image data. This makes it possible to output a higher quality image of an illustration.

18 Claims, 12 Drawing Sheets

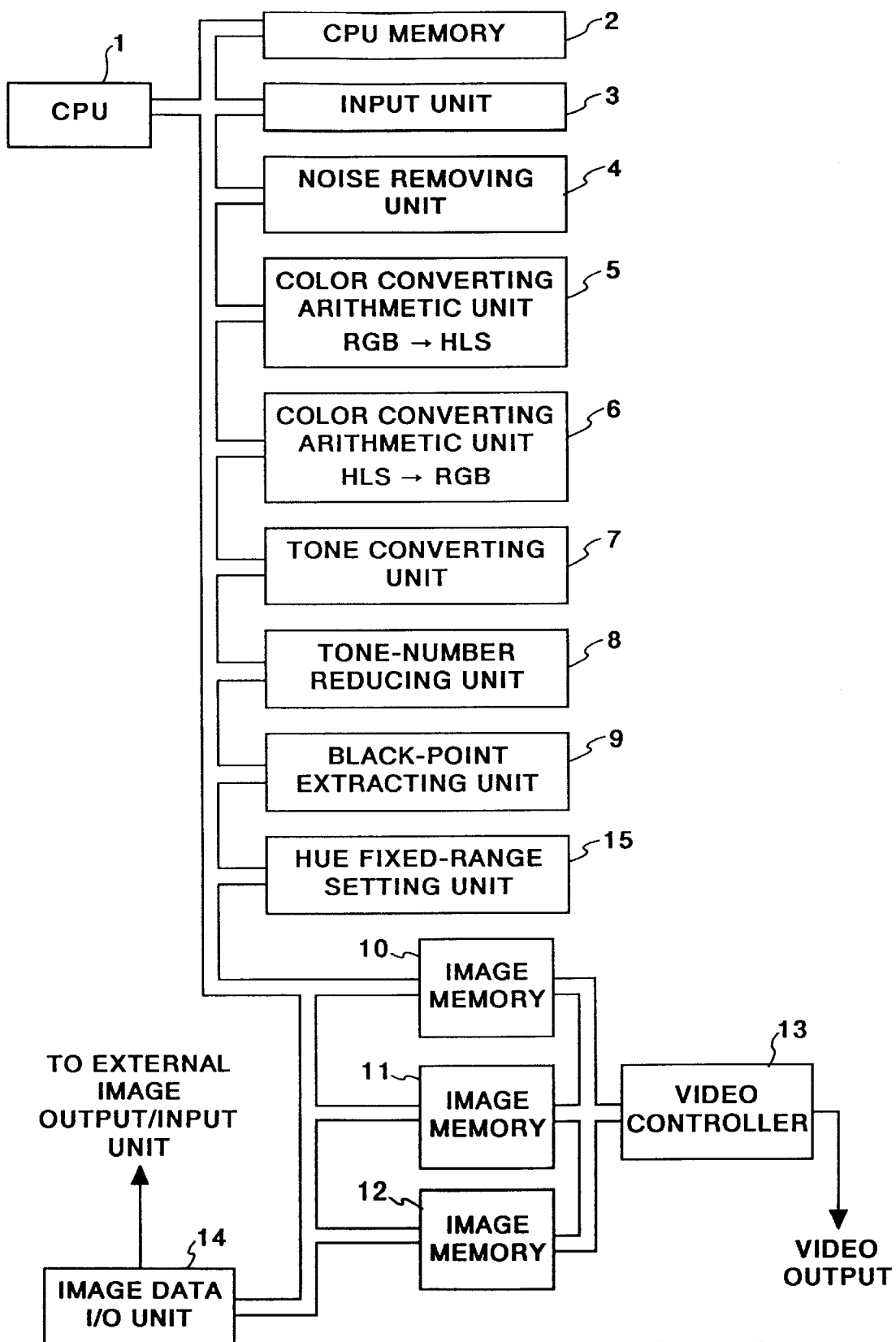
F I G. 1

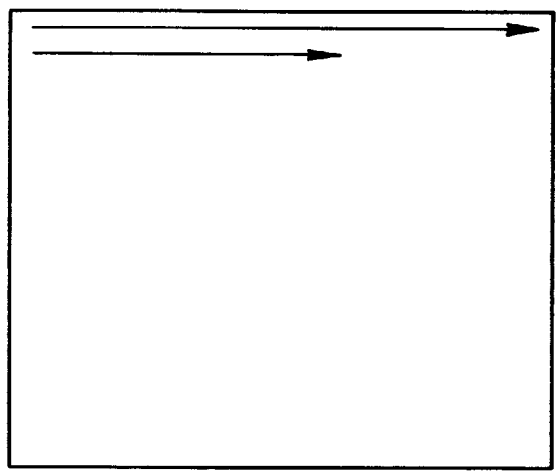
FIG. 8
FIG. 9
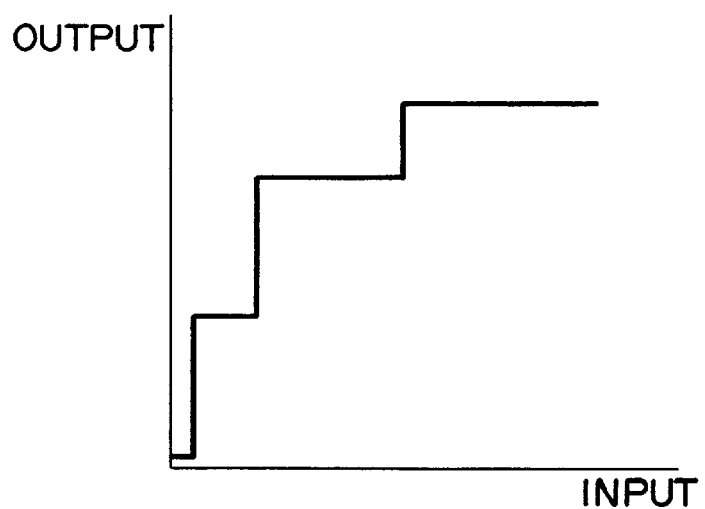
FIG. 10
FIG. 11

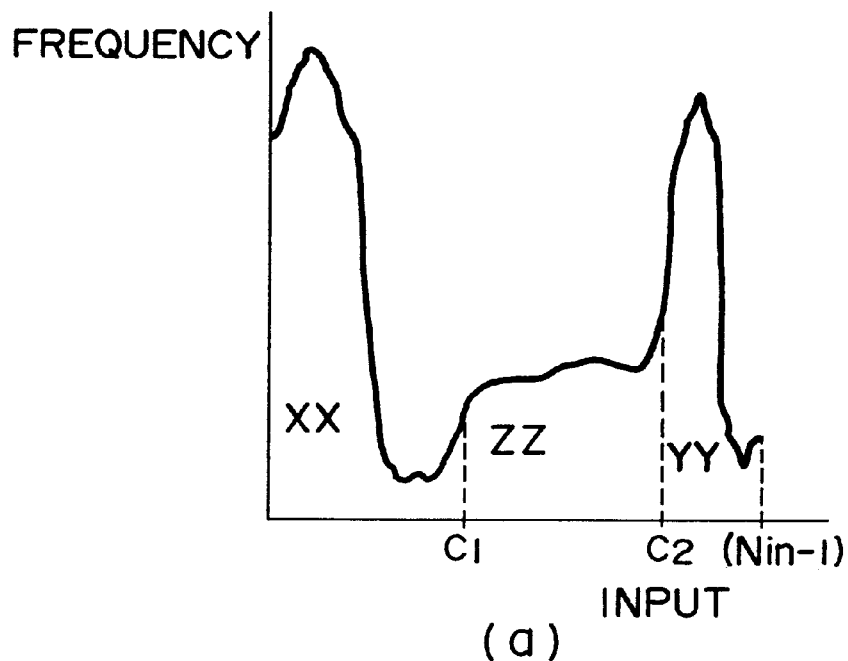
(a)
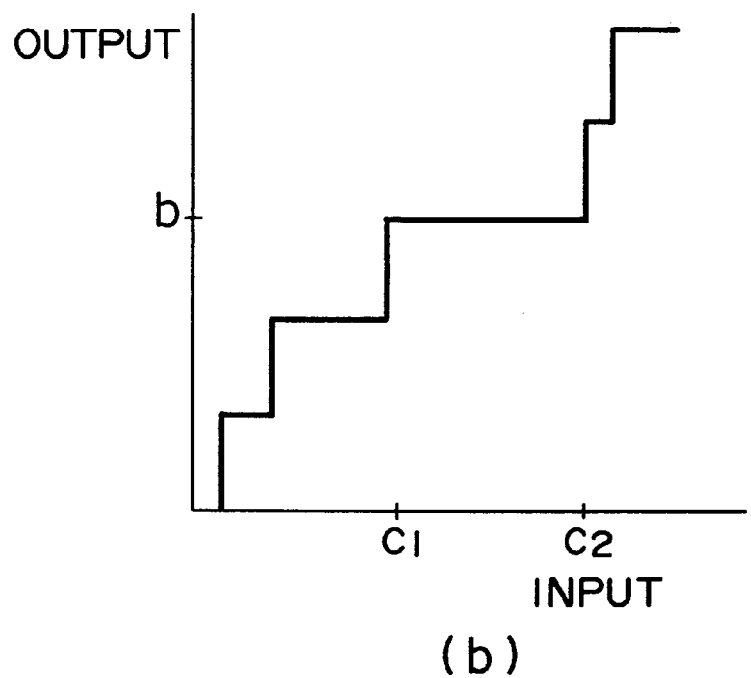
(b)
F I G. 12

IMAGE PROCESSING SUITABLE FOR CHANGING THE NUMBER OF COLORS IN AN IMAGE

This application is a continuation of U.S. application Ser. No. 08/073,614, filed Jun. 8, 1993, now abandoned, which is a continuation of U.S. application Ser. No. 07/577,008, filed Sep. 4, 1990, now abandoned.

BACKGROUND OF THE INVENTION

1. Field of the Invention

This invention relates to an image processing apparatus and method for converting and outputting a digital image comprising a density signal obtained by reading the original of an image.

2. Description of the Prior Art

One example of an illustration technique involves projecting a photographic image on paper, obtaining a diagram of the photograph by tracing positions at which the profile and tone of the photograph change, and painting portions on the diagram having the same color and tone with a pigment or pasting colored paper referred to as pantone to produce an image having an effect entirely different from that of the original photograph.

However, when an image is produced by this technique, the following drawbacks are encountered:

(1) It is necessary that the photograph of an original expressed by a near infinity of colors be re-expressed by a limited number of colors. This requires the sense and experience of an illustrator and is difficult for a novice to achieve.

(2) The tracing work and the work required for painting or pasting of the colored paper is an extremely detailed manual operation demanding a high level of skill and an exorbitant amount of time.

(3) A color once painted or pasted on is difficult to change later on and great care must be taken so as not to make a mistake during the painting or pasting operation.

Well-known image processing techniques using a computer include electronic photoengraving in the printing industry and professional laboratory techniques which apply computerized photographic image processing in the photographic laboratory industry.

For example, in a case where the original of an image is read by a high-precision scanner such as a drum scanner and a reproduced image is obtained by operating an image output apparatus, such as a laser-beam printer or film recorder, using the resulting signal, an image processor is provided for the intermediate part of the process, and an input density signal is subjected to such processing as a density expression correction (a γ correction), tone setting, color correction and assembly of cuttings. The following effects are obtained:

(1) Faded color film can be restored.

(2) The tones of highlights and shadows can be adjusted and color representation can be emphasized.

(3) Mechanical failures, photographic errors and errors in development can be remedied.

(4) Unnecessary objects (power lines, rubbish, scratches, etc.) in the image can be eliminated or revised.

(5) A creative image can be expressed and the image area can be enlarged to create a new design.

When special processing of this kind is executed, a film original is photoelectrically scanned and read by a high-precision color scanner, color camera tube or color solid-state image sensor (e.g., a CCD), and processing is performed in dependence upon the density signal of the film original or a digital image signal such as a luminance signal.

Examples of such special processing include systematically arranged mosaic processing, solarization processing, in which a γ curve is made into something unrealistic or discontinuous, and posterization processing.

For example, consider posterization processing, which is comparatively close to an illustration. First, a characteristic feature of an illustration is that the number of colors is limited. In this sense, posterization processing, which reduces the number of tones, satisfies the condition.

More specifically, when a color image is dealt with by a computer, ordinarily the image is expressed by a combination of data composed of the three primary colors red (R), green (G) and blue (B). In posterization processing, processing is executed to reduce each of the R, G and B items of data from 256 tones to 5 tones, by way of example. In this case, a number of colors of greater than 16,000,000 in the original image is reduced to 125 ($5^3$).

In the example of the prior art described above, however, the following drawbacks are encountered:

First, FIG. 2(a) illustrates, as one example of an original image, the relationship between density data and position in a case where the color orange becomes brighter little by little from left to right. When this data is subjected to posterization processing in accordance with the input/output relationship shown in FIG. 2(b), the R and G items of data are converted as shown in FIG. 2(c). At this time the ratio of R and G undergoes a large change at the positions A, B, C and D. As a result, the color tone changes.

More specifically, the image becomes yellow from the left side up to A, near red from A to C, orange from C to D, and near red again when D is surpassed. The case of an actual illustration, the atmosphere is different from that of an image obtained by the posterization processing of light in order to select colors, such as a pale orange color, intermediate orange color and dark orange color, even if the number of colors is limited.

Furthermore, if the scene serving as the subject is the face of a human being, for example, a pseudo-profile may occur on the inner side of the face with ordinary posterization or with the method of reducing the number of colors. This will not provide a desirable expression of an illustration.

SUMMARY OF THE INVENTION

An object of the present invention is to provide an image processing apparatus in which a photographic original can be converted into an illustration image of the kind painted by an illustrator without requiring a high level of skill, and in which the photographic original can be converted into a high-quality illustration image not influenced by the scene of the original, wherein the conversion does not require time and labor and can be performed again with ease the case of failure the first time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram of an image processing apparatus according to a preferred embodiment of the present invention;

FIGS. 8 and 9 are diagrams for describing extraction of black points;

FIG. 10 is a diagram illustrating a convolution filter;

FIG. 11 is a diagram for describing processing which reduces the number of tones in another embodiment;

FIG. 12(a) is a diagram illustrating a histogram of an input tone range, and FIG. 12(b) is a diagram showing the input/output relationship of the histogram of FIG. 12(a);

DESCRIPTION OF THE PREFERRED EMBODIMENTS

The preferred embodiments of the present invention will now be described in detail with reference to the accompanying drawings.

FIG. 1 is a diagram which best represents the characterizing features of the present invention. Numeral 1 denotes a central processing unit (CPU) which controls the overall apparatus in accordance with a processing procedure written in a CPU memory 2. The CPU memory 2, composed of RAM and ROM, etc., stores the processing procedure and parameters for processing. Numeral 3 denotes an input device such as a keyboard or mouse used in entering commands and in designating selections. Numeral 4 denotes a noise removing device for removing noise in image data, 5 a color conversion arithmetic unit for converting color image data from a red, green and blue (R, G, B) color coordinate system to data in a hue, luminosity and saturation (H, L, S) color coordinate system, and for outputting the data. Numeral 6 represents a color converting arithmetic unit for converting image data from data of an entered HLS color coordinate system to data in an RGB color coordinate system.

Numeral 7 denotes a tone converting unit for converting the tone of the saturation data, and 8 a unit for reducing the number of tones. The later subjects each item of HLS data to a tone conversion in dependence upon the number of output tones. Numeral 15 designates a hue fixed-range setting unit which receives, from the input device 3, an arbitrary range regarding hue from among the data converted into the HLS coordinate system, and which sets a hue range wherein tone is converted into a fixed tone value at the time of a conversion. Numeral 9 denotes a block-dot extracting unit for a detecting pixel having a color different from that of periphery pixels. Numerals 10 through 12 designate image memories which store image data. By way of example, information composed of eight bits (256 tones) per pixel can be stored. More specifically, 24 bits per pixel are stored by the three memories 10 through 12. Numeral 13 represents a video controller for reading the contents out of the image memories 10 through 12 and outputting these contents as a video signal. The video signal can be displayed as an image on a monitor (not shown) or outputted to a video printer. Numeral 14 denotes an image data I/O unit through which an image from an image input unit (not shown) is inputted to the image memories or an image is outputted to an image output unit (not shown).

Figure 15:
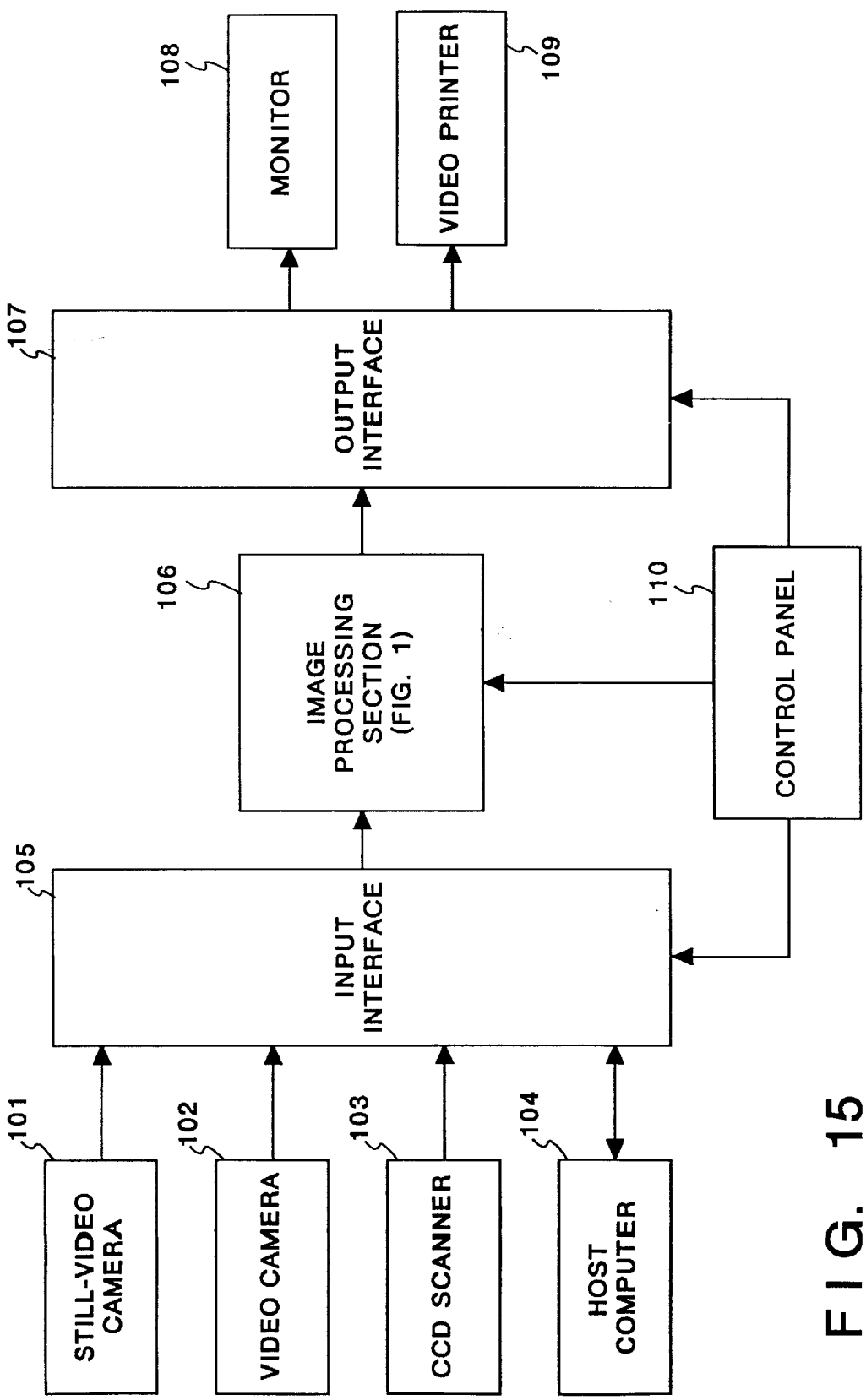
FIG. 15 is a block diagram illustrating the overall construction of an image processing apparatus of the embodiment of FIG. 1.

FIG. 15 is a block diagram illustrating the overall construction of an image processing apparatus of the present embodiment which includes the image processing section shown in FIG. 1.

Numeral 101 denotes a still-video camera for inputting image information relating to a still picture. Numeral 102 denotes a video camera for inputting, frame by frame or field by field, image information relating to a moving picture. Numeral 103 represents a CCD color scanner for scanning an original by line scanners for each of the colors R, G, B, by way of example, thereby inputting pixel data. Shown at 104 is a host computer for inputting a paint command and image data. An input interface 105 has a frame memory for accepting one frame of image information from the still video camera 101, video camera 102 and CCD scanner 103. The input interface 104 also has a function for developing the image data in the frame memory in response to the paint command from the host computer 104. The input interface selects the above-mentioned input means in dependence upon an instruction from a control panel 110. The image data from the input interface 105 enters an image data I/O of an image processing section 106 described in connection with FIG. 1, as a result of which the image data is subjected to the processing described earlier. The image data that has been subjected to the prescribed processing is sent from the video controller 13 (FIG. 1) to the output interface 107. Numeral 108 designates a monitor for displaying an image in accordance with the video signal. Numeral 109 represents a video printer having color laser-beam printer for forming a latent image on a photosensitive body by a laser beam and developing the latent image to form a visible image. It should be noted that the video printer can be a color ink-jet printer, a dot printer or a thermal transfer printer. The output interface 107 selects the output means in response to an instruction from the control panel 110. The control panel 110 selects the input means and output means, as set forth above.

The operation of the image processing apparatus according to this embodiment will now be described in accordance with the flowchart of FIG. 3.

First, when a processing-start command is provided from the keyboard of the input device 3, the CPU 1 subjects the images in the image memories 10 through 12 to noise-removal processing at step S1. This processing takes the mean value of pixels adjacent to a pixel of interest and treats this mean value as new data indicative of this pixel. In other words, a convolution filter of the kind shown in FIG. 10 is applied to the entire image to remove noise. Next, at step S14, a fixed range in the hues, described below, is set using input means. This is to add a condition to the hue tone conversion in the tone reduction processing of step S5, described later.

Figure 4:
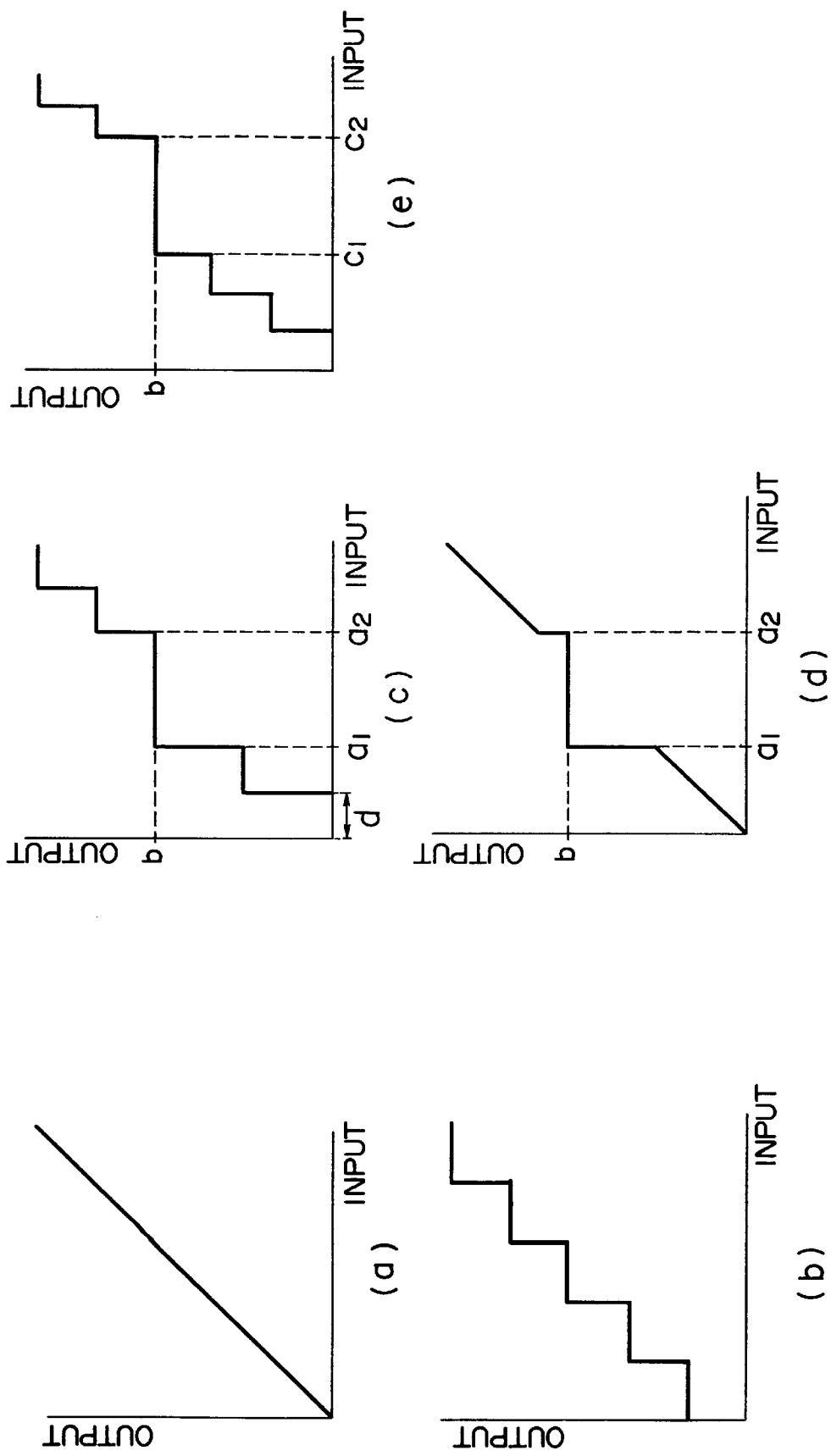
FIGS. 4(a) through (e) are diagrams for describing a hue tone conversion method in the embodiment of FIG. 1.

The method of hue tone conversion in this embodiment will be described with reference to FIG. 4.

FIGS. 4(a) through (e) illustrate the tones of input data along the horizontal axes and the tones of output data along the vertical axes. FIG. 4(a) shows the tones when tone conversion has not yet been applied, and FIG. 4(b) is a graph in which ordinary tone reduction has been applied. In this tone reduction processing, input hue values of "0" through "255" are reduced evenly to output values having five levels.

FIG. 4(c) adopts five tones as the output tones, as in FIG. 4(b), designates $a_1$, $a_2$ as the tone-fixed range, and sets the output tone to a fixed value b with respect to an input tone in the interval $a_1$–$a_2$. The method of designating $a_1$, $a_2$ involves designating the desired output tone value b and then designating the limits $a_1$, $a_2$ of the desired input tones corresponding to b. The relationship between input and output at this time is as shown in FIG. 4(d). Let $N_{out}$ represent the desired number of output tones. Since one tone will be set at the value b, the remaining in number will be $N_{out}$–1 tones. Letting $N_{in}$ represent the number of all input tones, the number of input tones outside the designated range can be expressed by $N_{in}$–($a_2$–$a_1$+1).

When $a_1$=0 or $a_2$=$N_{in}$ or $N_{out}$–1 is an even number, the input tone range [d in FIG. 4(c)] with respect to one level of the output tones can be expressed by [$N_{in}$–($a_2$–$a_1$+1)]÷($N_{out}$–1). The input/output relationship thus obtained is as shown in FIG. 4(c).

When $a_1 \neq 0$, $a_2 \neq N_{in}$ and $N_{out}$–1 is an odd number, $a_1$–1 and $N_{in}$–$a_2$ are compared, the input tones having the larger values are partitioned into ($N_{out}$1)÷2+1 (an integer) levels, and those having the smaller values are partitioned into ($N_{out}$1)÷2 (an integer) levels. For example, if the desired number of output tones is six, the input/output relationship is as shown in FIG. 4(e) in a case where $C_1$, $C_2$ is adopted as the fixed range.

The present embodiment performs a tone conversion of hue components by the foregoing method.

Figure 2:
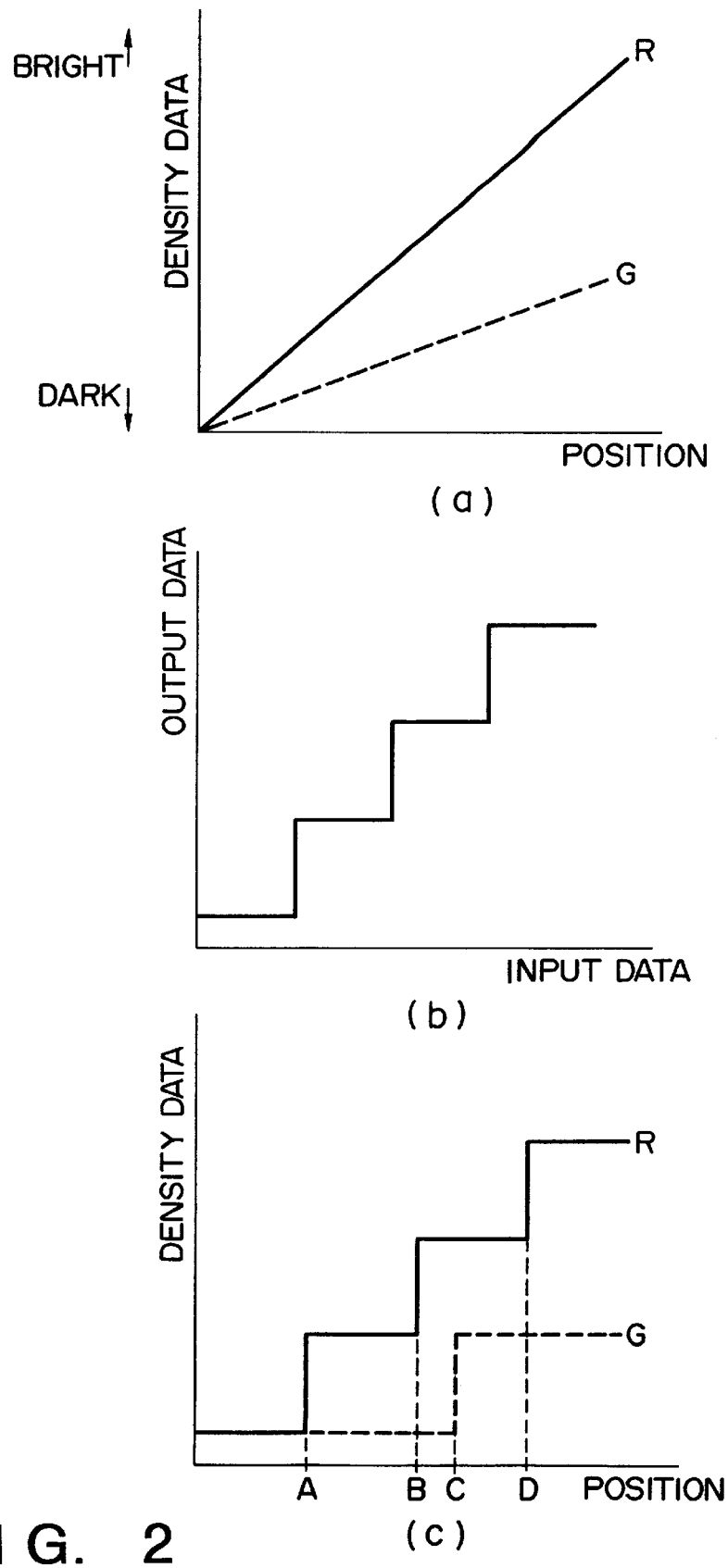
FIGS. 2(a) through (c) are diagrams for describing algorithms according to the prior art.
Figure 3:
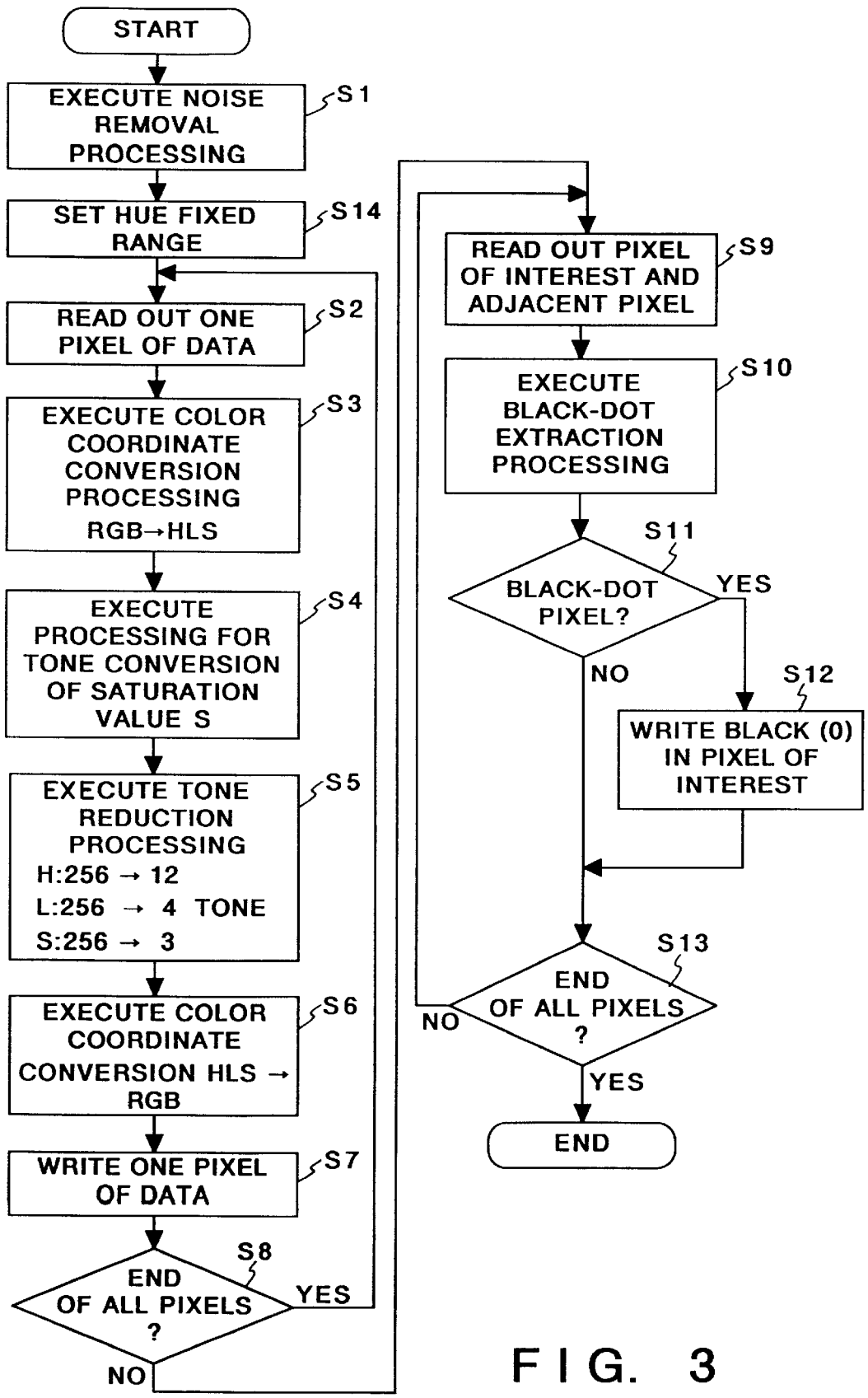
FIG. 3 is a flowchart illustrating image processing in the embodiment of FIG. 1.

Returning to the flowchart of FIG. 3, the CPU 1 reads one pixel of image data out of each of the image memories 10 through 12 at step S2. The image data at this time is of the RGB format. Next, at step S3, the read data is transferred to the color conversion arithmetic unit 5 to be converted into HLS data.

Figure 5:
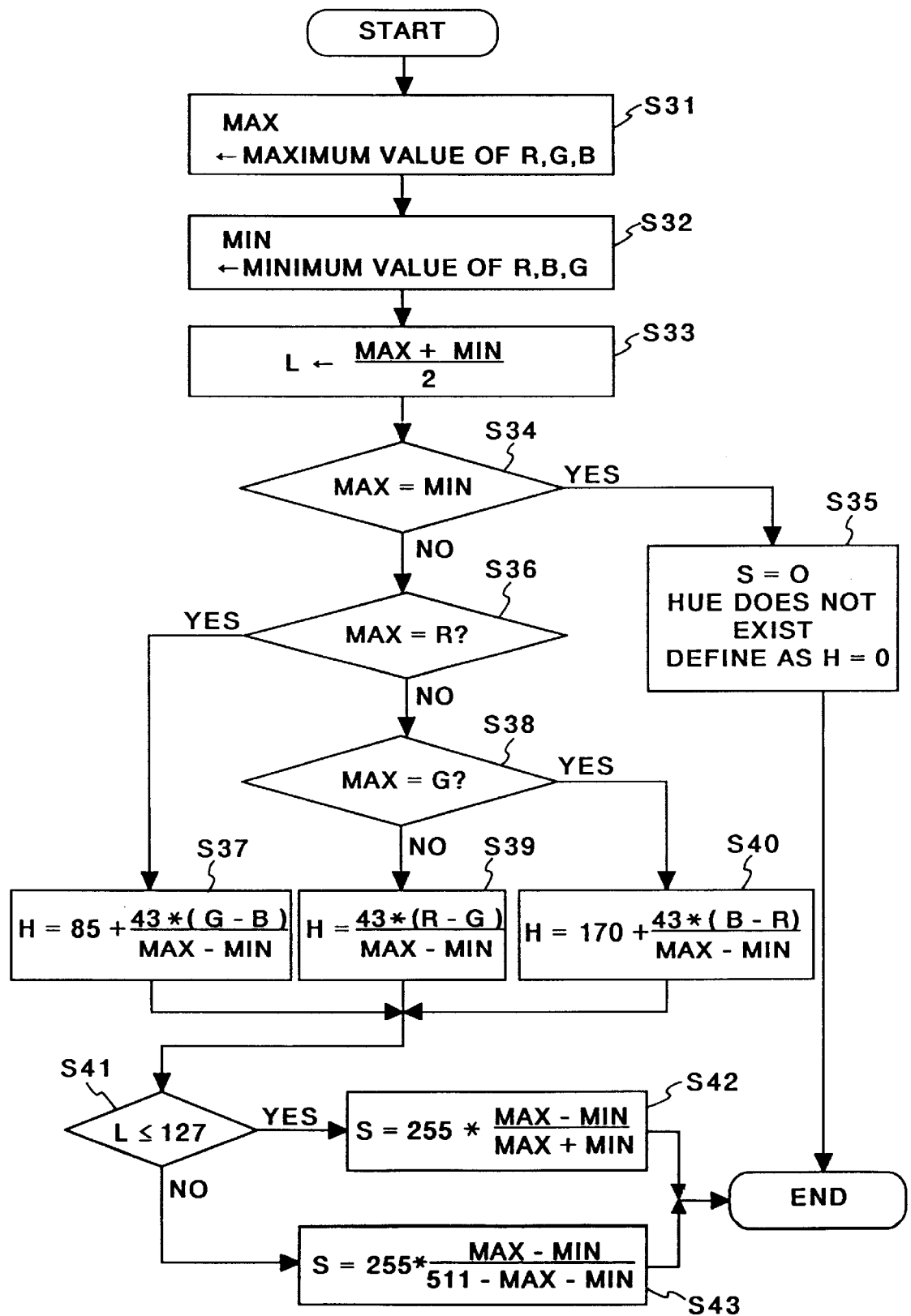
FIG. 5 is a flowchart of a process in which RGB data is converted into HLS data.

Reference will be had to the flowchart shown in FIG. 5 to describe an arithmetic algorithm, executed by the color conversion arithmetic unit 5, for effecting a conversion from the color coordinate system of red, green, blue (R, G, B) to the color coordinate system of hue, luminosity and saturation (H, L, S).

First, at step S31, the maximum datum is extracted from among the R, G, B values of one pixel of datum, and this datum is made MAX. The minimum datum is extracted and made MIN at step S32. Next, at step S33, these values of MAX and MIN are added and the sum divided by two, and the result is adopted as the value of luminosity L. This is followed by step S34, at which it is determined whether the values of MAX and MIN are equal. If they are equal, it is deemed that a hue does not exist and the program proceeds to step S35. Since the color is achromatic in this case, saturation S is 0 and hue does not exist. Therefore, hue H is indeterminate. In this case, however, H is defined as being "0" and the conversion is ended.

If the values of MAX and MIN are not equal at step S34, it is determined at step S36 whether MAX and the value of R are equal. If they are equal, many red-color components are contained. Therefore, the program proceeds to step S37, where the value of H is obtained from the following equation:

$$H = 85 + \frac{43 \times (G - B)}{MAX + MIN}) \quad (1)$$

Here constants 85, 43 signify ⅓×256 and ⅙×256, respectively. This means that the hue H containing many red-color components is coded in a range of 43 above and below the hue data 85. The "256" here is the number of levels, in which the image data usually is treated as eight bits. If the eight bits are treated as 360° of a hue circle, the above-mentioned hue containing many red-color components is made an angle and is coded with 120° serving as the center.

However, if MAX and the value of R are not equal at step S36, it is determined at step S38 whether MAX and the value of G are equal. If they are equal, many green-color components are contained. Therefore, the program proceeds to step S40, where the value of H is obtained from the following equation:

$$H = 170 + \frac{43 \times (B - R)}{MAX + MIN}) \quad (2)$$

Here constants 170, 43 are ⅔×256 and ⅙×256, respectively (ef. the constants in step S37). This means a hue containing many green-color components is assigned the data 170±43, namely an angle, and is encoded with 240° serving as the center. If MAX and the value of G are not equal at step S38, many blue-color components are contained and therefore the program proceeds to step S39, at which the value of H is obtained from the following equation:

$$H = \frac{43 \times (R - G)}{MAX + MIN}) \quad (3)$$

This means a hue containing many blue-color components is assigned the data value 0±43, namely an angle, and is encoded with 0° serving as the center.

Next, at step S41, the value of L obtained at step S33 and "127" are compared. If L is equal to or smaller than "127", then the program proceeds to step S42, at which the value of saturation S is obtained from the following equation:

$$S = 255 \times \frac{MAX - MIN}{MAX + MIN} \quad (4)$$

If the answer at step S41 is NO, then the program proceeds to step S43, at which the value of saturation S is obtained from the following equation:

$$S = 255 \times \frac{MAX - MIN}{511 - MAX - MIN} \quad (5)$$

When HLS is obtained by the foregoing processing, the program returns to step S4 in FIG. 3, the data of saturation S in the HLS data is transferred to the tone converting unit 7, and a conversion is made based on the equation given below. This conversion equation can be expressed by Eq. (6), in which the data is assumed to be eight-bit data:

$$S'=255\times(S/255)^{1/3} \quad (6)$$

In order to use vivid colors in an illustration, dull colors in the original image are converted into vivid colors. For this reason, a tone conversion should be applied to the data of saturation S by Eq. (6).

The HLS data thus obtained is sent to the unit 8 for reducing the number of tones, where a tone conversion of the kind illustrated in FIGS. 4(c), (4) is carried out. The number of tones obtained following the tone reduction in this case differs for each of the H, L and S. The reason is as follows: For example, the output tones set in this embodiment are 12 tones for hue H, four tones for luminosity L and three tones for saturation S. Here, hue H is compared with the others and those having a large number of tones cover one basic color.

In other words, if there are 12 types of hue H, three primary colors, their complementary colors and the intermediate colors thereof can be expressed. The reason for adopting four kinds of luminosity L is as follows: For respective ones of the hues, dark orange, somewhat dark orange, somewhat bright orange and bright orange, for example, can be expressed. The reason for adopting three kinds of saturation is so that a dull orange color, ordinary orange and a vivid orange color can be expressed.

Accordingly, the number of colors capable of being expressed in the present embodiment is 144. Furthermore, in the present embodiment, the number of output tones of HLS is set in advance, as described above. However, the number of output tones may be set separately to any desired number. For example, it is permissible to reduce only the number of tones for L without changing the numbers of tones for H and S. In addition, the number of tones reduced is not limited to the example described above, and the particular numerical value can be designated using the input means.

As described above, the data of the HLS in which the number of tones has been reduced is transferred to the color converting arithmetic unit 6, in which processing is executed at step S6 in FIG. 3 for a color-coordinate conversion from HLS to RGB. The processing executed by the color converting arithmetic unit 6 will now be described in accordance with the flowchart shown in FIG. 6.

Figure 7:
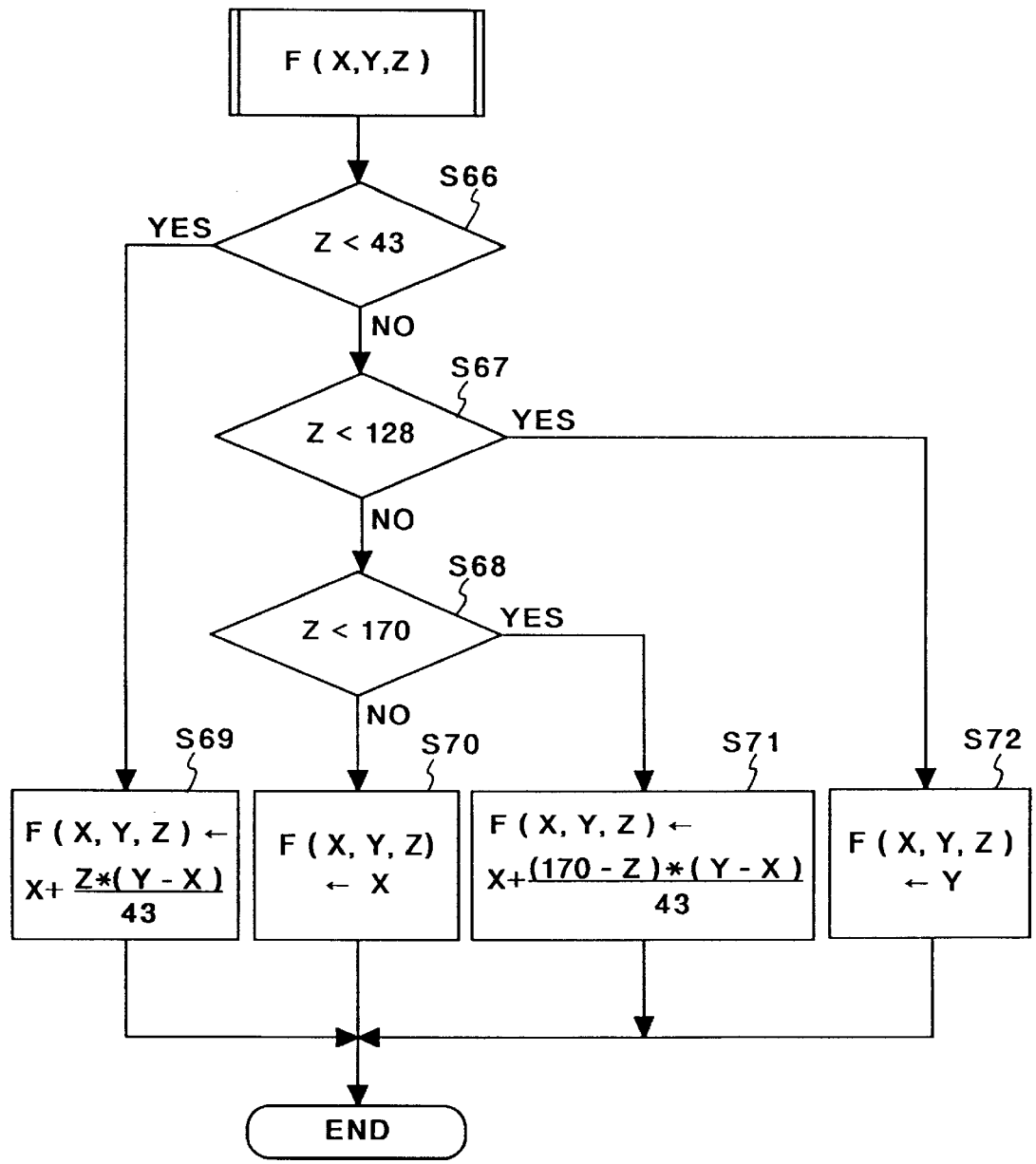

First, at step S61, the value of L is compared with "127". If the value of L is greater than "127", the program proceeds to step S63, at which the value of a parameter M2 is made L+S−L×S; otherwise, the value is made L+S. Next, the program proceeds to step S64, at which the value of a parameter M1 is obtained as M1=2×L−M2 from M2 just found. The values of R, G, B are calculated at step S65 using the values of M1, M2 and H. A function F (X,Y,Z) in step S65 is shown in FIG. 7.

The value of a third parameter Z is compared with "43" at step S66. If Z is less than "43", the value of F (X,Y,Z) is made $$F = X + \frac{Z \times (Y - X)}{43}$$

at step S69. Otherwise, the program proceeds to step S67, at which Z is compared with "128". If Z is less than "128", the value of F (X,Y,Z) is made Y at step S72. Otherwise, the program proceeds to step S68, at which the value of Z is compared with "170". If Z is less than "170", the value of F (X,Y,Z) is made $$F = X + \frac{(170 - Z) \times (Y - X)}{34}$$

at step S71. Otherwise, the value of F (X,Y,Z) is made X at step S70.

R, G, B are obtained with regard to the aforementioned function F (X,Y,Z) at step S65. In this computation, R should be made F(M1, M2, H), G should be made F(M1, M2, H+170), and B should be made F(M1, M2 H+85).

By virtue of the foregoing processing, the data converted into the R, G, B format is written in the image memories 10 through 12 by the CPU 1 at step S7 in FIG. 3. The processing of steps S2 through S7 described above is applied to the pixels of the entire image. At the end of all processing, the program proceeds from step S8 to step S9, where processing for adding black lines is performed. This is implemented by blackening boundary pixels where there is a change in the color of the image.

At step S9, the CPU 1 reads a pixel of interest as well as the pixels adjacent thereto out of the image memories 10 through 12 and delivers these pixels to the black-dot extracting unit 9. By way of example, the read pixels are a pixel of interest X and adjacent pixels A, B shown in FIG. 8. Letting the pixel data of R, G, B at position x be represented by $D_R(x)$, $D_G(x)$, $D_B(X)$, respectively, the condition for judging that the pixel of interest is a black dot is that the color of the pixel of interest be different from that of the adjacent pixel. For example, when the following holds, the pixel of interest X is judged to be a black dot:

$$D_R(X) \neq D_R(A)$$

or $$D_R(X) \neq D_R(B)$$

or $$D_G(X) \neq D_G(A)$$

or $$D_G(X) \neq D_G(B)$$

or $$D_B(X) \neq D_B(A)$$

or $$D_B(X) \neq D_B(B)$$

The above-described black-dot extraction processing is performed at step S10. If it is determined at step S11 that the pixel of interest X is a black-dot pixel, the program proceeds to step S12, at which the black data, namely "0", is written in the image memories 10 through 12. Next, at step S13, it is determined whether the processing has ended for all pixels. If the processing has not ended, then the processing from step S9 to step S12 is repeated.

In the read processing of step S9, the reason for selecting A on the right side and B on the bottom side of the pixel of interest X in FIG. 8 as the pixels for comparison is as follows: Since the processing sequence is from the left and above of the image, as indicated by the arrows in FIG. 9, it is necessary that the black-dot conversion processing be compared with portions not processed. If the pixels (C,D) to the left and above X were to be compared, then, even if X, C and D were the same color before the black-dot conversion, the colors of X and C would be different and X also would be a black dot if C were a black dot. The end result would be that the entire image would be completely black.

In accordance with the embodiment described above, anyone can simply create a vivid illustration from a natural picture, such as a photograph, having many dull colors. This can be accomplished irrespective of the scene of the original, and even if the original is a scene such as a human face.

OTHER EMBODIMENT

Another embodiment of the present invention will now be described with reference to the related drawings.

In the foregoing embodiment, it is desired to express an original hue in six tones. However, a case can be conceived in which the actual data has no data, or very little data, between input tones (hue values) $x_1$, $x_2$ of FIG. 4(e), by way of example. Even if the image after the tone conversion actually has hues of only five tones or six tones, there are instances where the proportion of $x_1$, $x_2$ occupied by hue (with respect to the entirety of the image) is small and the effect of image processing declines.

Accordingly, in this embodiment, a histogram of the input image is acquired and a histogram of the input tone range of interest is accumulated in the CPU memory 3. This value is divided by the number of output tones in the range of interest, and a corresponding input tone is obtained for every cumulative histogram partitioned in the histogram, thereby deciding an input tone range with respect to a desired output tone.

By way of example, in a case where the desired output tones are six, the input tones $c_1$–$c_2$ are fixed, and the output tone with regard to $c_1$–$c_2$ is b, similar to FIG. 4(e), first the histogram of the input image is created. FIG. 12(a) shows one such example.

Next, the frequencies of the portions of the input tone values "0"–($c_1$–1) and ($c_2$+1)–($N_{in}$–1) in the histogram are accumulated.

It should be noted that $N_{in}$ is the number of input tones. This value is made XX, YY, and the cumulative frequency in the fixed range is made ZZ. Since the desired output tones are six in number and there is a fixed range, it is necessary to determine an input-tone range corresponding to the outputted five tones. When $c_1$=0 or $c_2$=$N_{in}$–1 in the fixed range, (XX+YY)÷5 is merely performed and the input tone frequency is obtained from the cumulative frequency.

In a case where the fixed range is in the middle of the input tones 0–($N_{in}$–1), as shown in FIG. 12(a), the output tones are partitioned in dependence upon the percentage of the cumulative frequency of XX, YY. In other words, the output tones between 0 and $c_1$ can be calculated at XX×5÷(XX+YY) (an integer), and the output tones between $C_2$ and ($N_{in}$–1) can be obtained by subtracting the above-mentioned calculated value from 5.

If the output tones obtained here are AA, BB, respectively, the sought input tone value is obtained by counting from the frequency of input tone value 0 from the histogram and adopting the input tone value, which is indicated by the frequency of the XX÷AA×n (n=1, 2, . . . , AA–1) tone, as the value sought. Similarly, counting is performed from the frequency of $c_2$+1, and the input tone value indicated by the frequency of the YY÷BB×n (n=1, 2, . . . , BB–1) tone is obtained.

FIG. 12(b) illustrates the input/output relationship in a case where XX:YY=3:2, based on the histogram of FIG. 12(a).

In this embodiment, a tone conversion of hue components is carried out by the foregoing method.

Figure 13:
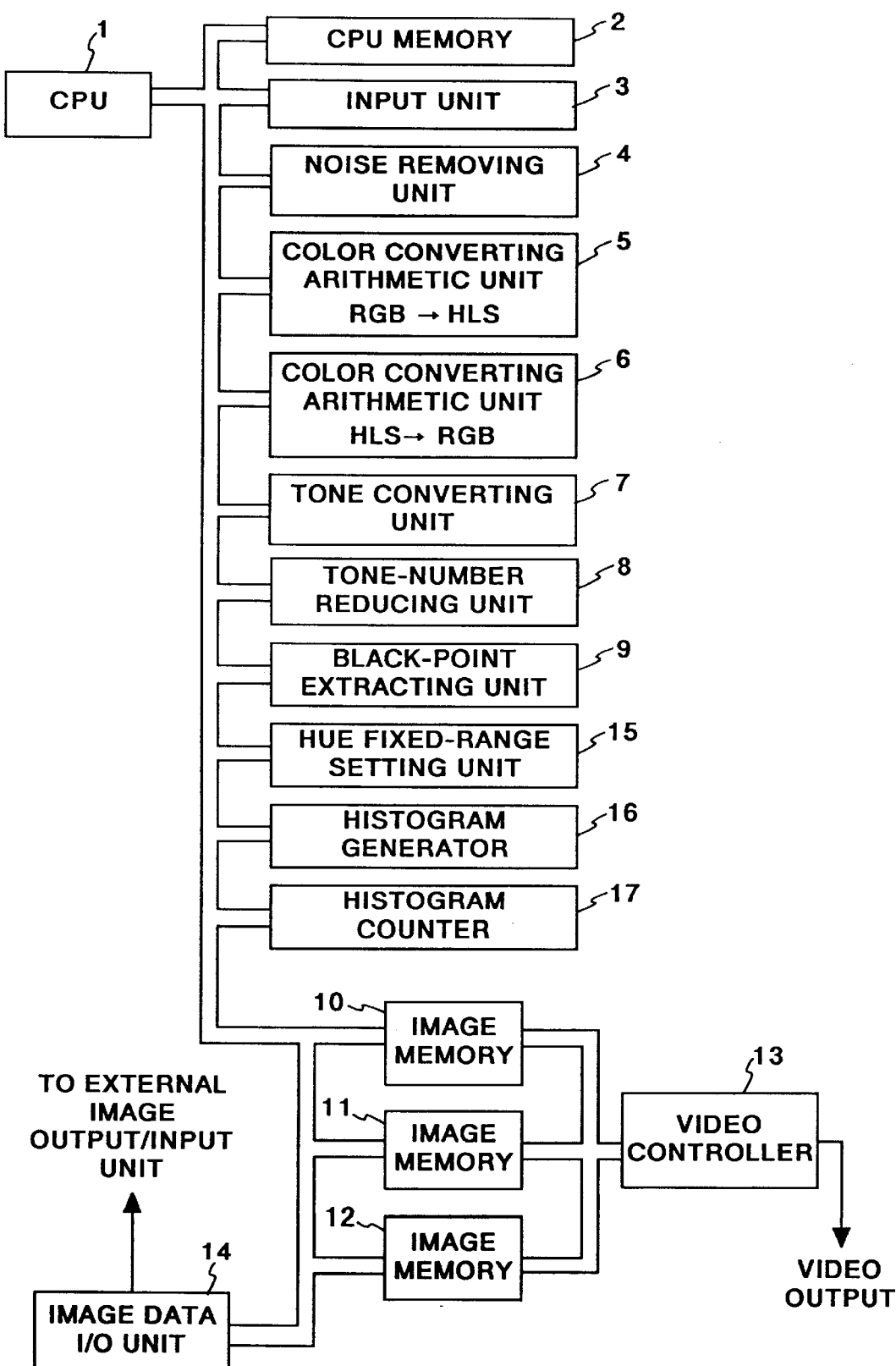
FIG. 13 is a block diagram illustrating an image processing apparatus in another embodiment.

FIG. 13 is a block diagram showing the construction of the image processing apparatus according to this embodiment.

In this embodiment, the arrangement of FIG. 1, described above, is further provided with a histogram generator 16 for generating a histogram of hue data, and a histogram counter 17 for accumulating the frequency between any two points. This apparatus is used to perform the tone conversion of hue components, described above.

Figure 14:
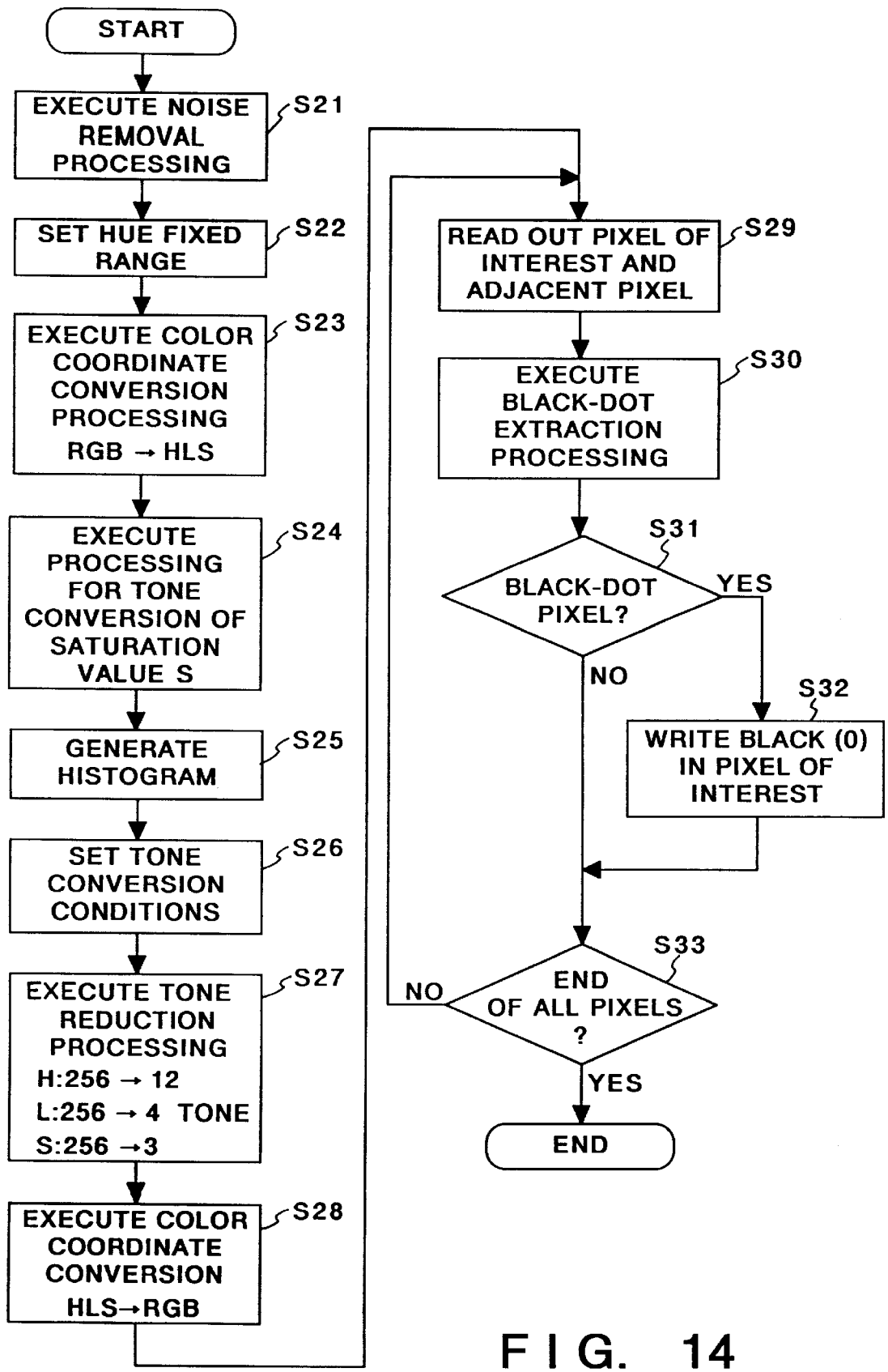
FIG. 14 is a flowchart illustrating image processing in another embodiment.

The operation of this embodiment will be described in accordance with the flowchart shown in FIG. 14.

First, when a processing-start command is provided from the keyboard of the input device 3, the CPU 1 subjects the images in the image memories 10 through 12 to noise-removal processing at step S21. This processing takes the mean value of pixels adjacent to a pixel of interest and treats this mean value as new data indicative of this pixel. In other words, a convolution filter of the kind shown in FIG. 10 is applied to the entire image to remove noise. Next, at step S22, a fixed range in the hues, described below, is set. This is to add a condition to the hue tone conversion in the tone reduction processing of step S27, described later.

Next, at step S23, the CPU 1 reads one pixel of image data out of each of the image memories 10 through 12. The image data at this time is of the RGB format. The read data is transferred to the color conversion arithmetic unit 5 to be converted into HLS data in accordance with the conversion arithmetic algorithm, as shown in FIG. 5. When HLS is obtained, the program proceeds to the processing of step S24. The data of saturation S in the HLS data is transferred to the tone converting unit 7, and a conversion is made based on the equation given below. This conversion equation can be expressed by Eq. (6), in which the data is assumed to be eight-bit data:

$$S'=255\times(S/255)^{1/3} \tag{6}$$

In order to use vivid colors in an illustration, dull colors in the original image should be converted into vivid colors. For this reason, a tone conversion is applied to the data of saturation S by Eq. (6).

Next, at step S25, the histogram generator 16 generates a histogram with regard to the hue H. Then, at step S26, tone conversion conditions are set from the histogram counter 17 prepared based on the above-described hue tone conversion method. This is followed by step S27, at which the HLS data is sent to the unit 8 for reducing the number of tones. Here a tone conversion based on the conditions set at steps S22, S26 is carried out. The number of tones obtained following the tone reduction in this case differs for each of H, L and S. The reason is as follows: For example, the output tones set in this embodiment are 12 tones for hue H, four tones for luminosity L and three tones for saturation S. Here, hue H is compared with the others and those having a large number of tones cover one basic color.

In other words, if there are 12 types of hue H, three primary colors, their complementary colors and the intermediate colors thereof can be expressed. The reason for adopting four kinds of luminosity L is as follows: For respective ones of the hues, dark orange, somewhat dark orange, somewhat bright orange and bright orange, for example, can be expressed. The reason for adopting three kinds of saturation is so that a dull orange color, ordinary orange and a vivid orange color can be expressed.

Accordingly, the number of colors capable of being expressed in the present embodiment is 144. Furthermore, in the present embodiment, the number of output tones of HLS is set in advance, as described above. However, the number of output tones may be set separately to any desired number.

Figure 6:
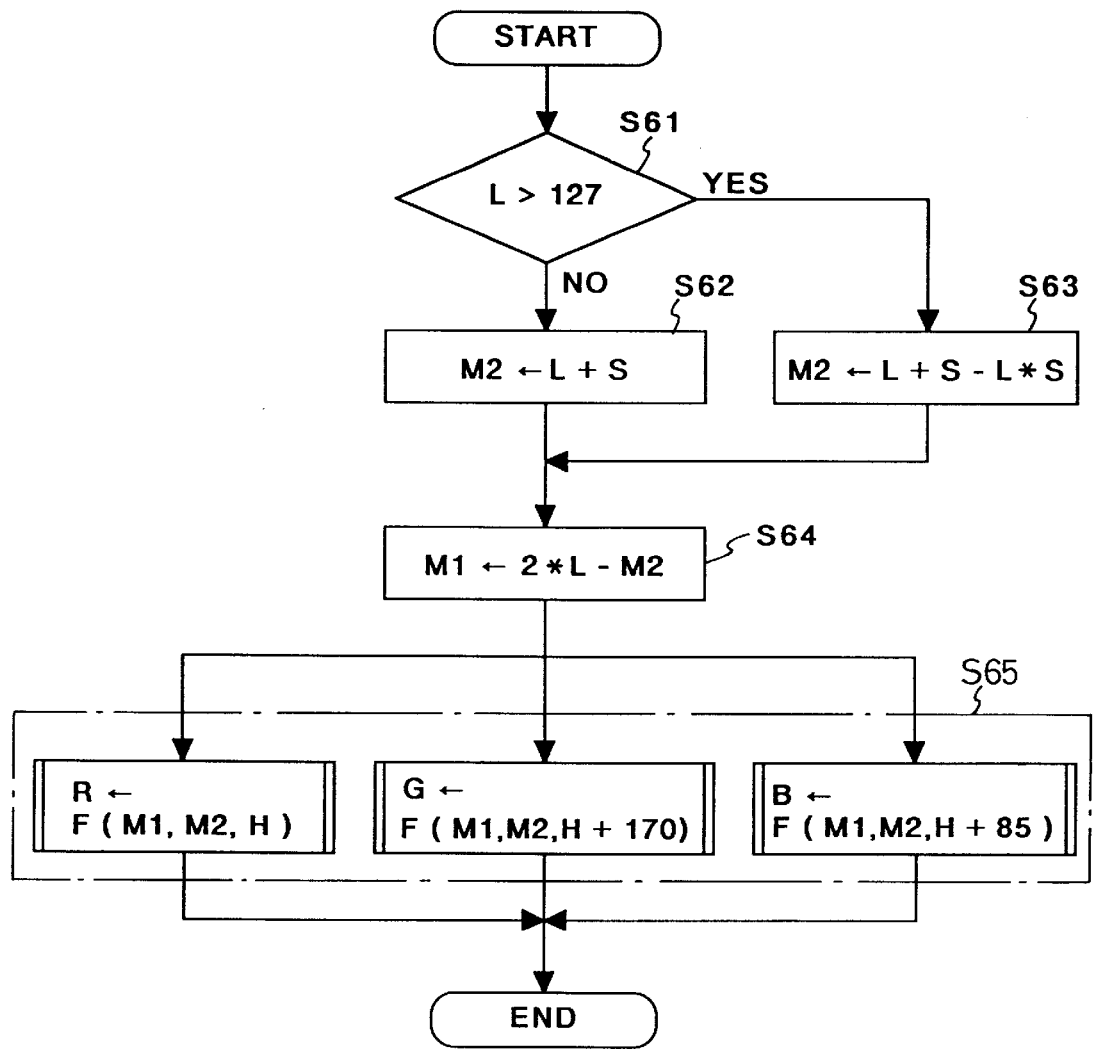
FIGS. 6 and 7 are flowcharts of processing in which HLS data is converted into RGB data.

As described above, the data of the HLS in which the number of tones has been reduced is transferred to the color converting arithmetic unit 6, in which processing is executed at step S28 for a color-coordinate conversion from HLS to RGB in accordance with the flowcharts shown in FIG. 6 and 7. The data converted into the RGB format is written in the image memories 10 through 12 by the CPU 1, and processing for adding black lines is performed. This is implemented by blackening boundary pixels where there is a change in the color of the image.

At step S29, the CPU 1 reads a pixel of interest as well as the pixels adjacent thereto out of the image memories 10 through 12 and delivers these pixels to the black-dot extracting unit 9. By way of example, the read pixels are a pixel of interest X and adjacent pixels A, B shown in FIG. 8. Letting the pixel data of R, G, B at position×be represented by $D_R(x), D_G(x), D_B(x)$, respectively, the condition for judging that the pixel of interest is a black dot is that the color of the pixel of interest be different from that of the adjacent pixel. For example, when the following holds, the pixel of interest X is judged to be a black dot:

$$D_R(X) \neq D_R(A)$$

or $$D_R(X) \neq D_R(B)$$

or $$D_G(X) \neq D_G(A)$$

or $$D_G(X) \neq D_G(B)$$

or $$D_B(X) \neq D_B(A)$$

or $$D_B(X) \neq D_B(B)$$

The above-described black-dot extraction processing is performed at step S30. If it is determined at step S31 that the pixel of interest X is a black-dot pixel, the program proceeds to step S32, at which the black data, namely "0", is written in the image memories 10 through 12. Next, at step S33, it is determined whether the processing has ended for all pixels. If the processing has not ended, then the processing from step S29 to step S32 is repeated.

In accordance with this embodiment, as described above, a histogram of the input image is acquired, and an input tone range corresponding to a desired output tone is decided based upon a histogram of the input tone range of interest, thereby making it possible to perform appropriate tone-reduction processing.

In the foregoing embodiment, the tone converting unit and the tone reducing unit are provided independently. However, if a conversion of the kind shown in FIG. 11 is performed in the tone reducing unit, both the tone conversion and the tone reduction can be carried out by the same unit.

Further, RGB is converted into HLS data. However, another method can be used. If the coordinate system is a color coordinate system expressing hue, saturation and luminosity, such as a coordinate system referred to as HVS, the conversion can be realized using even this coordinate system. It should be noted that a plurality of color-component signals such as YMC, L*a*b* can be inputted as well as RGM.

In the foregoing embodiment, a special-purpose processing unit is provided for each partial processing operation. However, all of the processing can be programmed and implemented by a general-purpose computer.

In addition, values are inserted in dialog fashion via an input unit 3 in order to set the hue range. However, in the unit for setting the fixed range, it is permissible to adopt a system in which values corresponding to a wide variety of originals are prepared in advance and selected.

Thus, in accordance with the present invention as described above, the convenience of the apparatus is improved by making it possible to convert an original such as a photograph into a high-quality illustration that is not influenced by the scene.

As many apparently widely different embodiments of the present invention can be made without departing from the spirit and scope thereof, it is to be understood that the invention is not limited to the specific embodiments thereof except as defined in the appended claims.

What is claimed is:

1. A color image processing apparatus for processing color image data, comprising:
   inputting means for inputting color image data of a color image having a predetermined number of tones;
   setting means for manually setting a number of tones for each color component representing the input color image data;
   tone converting means for reducing the predetermined number of tones of the input color image data to the number of tones manually set by said setting means;
   extracting means for extracting black-point data based on the color image data relating to a plurality of pixels adjacent to a pixel of interest; and
   output means for outputting the color image data converted by said tone converting means and the black-point data extracted by said extracting means.

2. The apparatus according to claim 1, further comprising a plurality of input means for inputting color image data respectively.

3. The apparatus according to claim 2, wherein one of said input means is a host computer.

4. The apparatus according to claim 1, further comprising removing means for removing noise from the color image data.

5. The apparatus according to claim 1, further comprising image forming means for forming an image on a medium.

6. The apparatus according to claim 1, further comprising a CPU for controlling the image processing apparatus based on a program stored in a memory.

7. The apparatus according to claim 1, further comprising converting means for converting the input color image data from a first color coordinate system to a second color coordinate system.

8. The apparatus according to claim 7, wherein the first color coordinate system is a red, green and blue color coordinate system, and the second color coordinate system is a hue, saturation and luminosity color coordinate system.

9. The apparatus according to claim 8, further comprising designating means for designating a range of input tones corresponding to a desired output tone value.

10. The apparatus according to claim 1, wherein said extracting means extracts black-point data from said converted color image data.

11. A color image processing method for processing color image data, comprising the steps of:
    inputting color image data of a color image having a predetermined number of tones;
    manually setting a number of tones for each color component representing the input color image data;
    reducing the predetermined number of tones of the input color image data to the number of tones set by the manually setting step;
    extracting black-point data based on the color image data relating to a plurality of pixels adjacent to a pixel of interest; and
    outputting the converted color image data and the black-point data.

12. The method according to claim 11, further comprising the step of designating a range of input tones corresponding to a desired output tone value.

13. The method according to claim 11, further comprising the step of converting the input color image data from a first color coordinate system to a second color coordinate system.

14. The method according to claim 13, wherein the first color coordinate system is a red, green and blue color coordinate system, and the second color coordinate system is a hue, saturation and luminosity color coordinate system.

15. A color image processing apparatus comprising:

inputting means for inputting color image data of a color image of a predetermined number of tones;

setting means for manually setting a number of tones in any one of a luminosity, saturation and hue; and tone converting means for reducing the predetermined number of tones of the input color image data to the number of tones manually set by said setting means as an editing process.

16. The apparatus according to claim 15, wherein said setting means sets a number of tones to each one of a luminosity, saturation and hue by a manual operation.

17. The apparatus according to claim 15, further comprising color separating means for separating the color image data into each component of a luminosity, saturation and hue, wherein said converting means performs a tone conversion of each component based on the number of tones set by the manual operation.

18. A color image processing method comprising the steps of:

inputting color image data of a color image of a predetermined number of tones;

manually setting a number of tones in any one of a luminosity, saturation and hue; and reducing the predetermined number of tones of the input color image data to the number of tones set by said manually setting step as an editing process.

* * * * *